Feb. 14, 1928.
J. W. HOOLEY
PANEL CABINET FOR ELECTRICAL CONNECTIONS
Filed Sept. 20, 1926
1,659,267
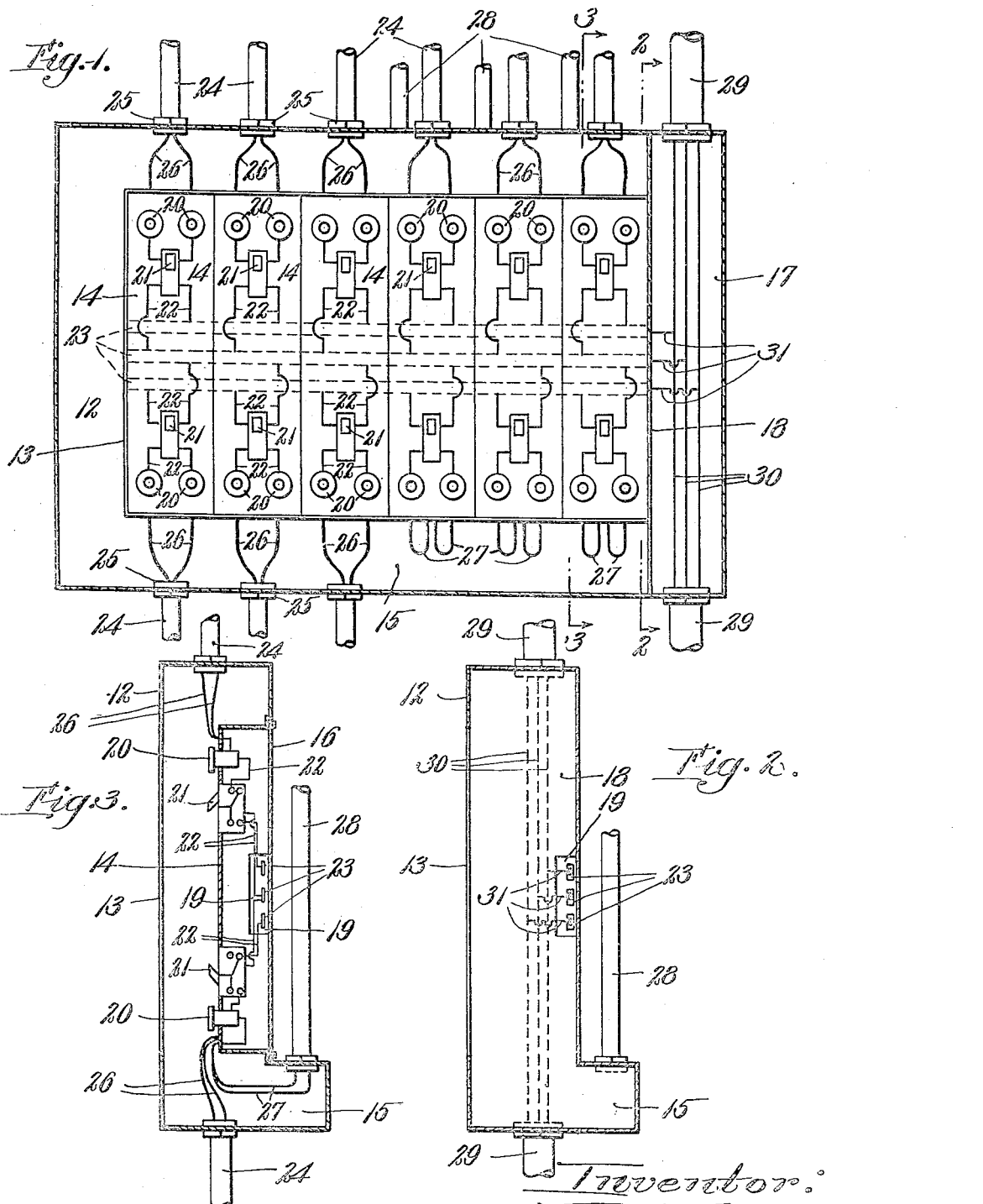
Inventor:
John W. Hooley
by A. W. Harrison
Attorney.

Patented Feb. 14, 1928.

1,659,267

UNITED STATES PATENT OFFICE.

JOHN W. HOOLEY, OF LARCHMONT, NEW YORK.

PANEL CABINET FOR ELECTRICAL CONNECTIONS.

Application filed September 20, 1926. Serial No. 136,716.

This invention relates to boxes or cabinets for the accommodation and reception of panel boards, distributing boards, switch boards, interconnection boxes for signal systems such as telephones, bells and any board that may be used for distributing light and power, wiring connections or wires or conductors.

In the customary panel box or cabinet as above described which is at present used in the trade, it has been standard practice to bring the conduits in on the top of the box or the bottom of the box and to place the circuit connections in a horizontal plane relatively to the box itself, and to provide gutters on four sides of the box by a slate barrier, or other means, and to run the wires around the gutters bringing them to the proper points of connection. This causes a crossing of wires or conductors, as the wires may be brought in on one side or on top of panel and then brought around to make a connection on the opposite side, and the positions of the fuse or circuit connections on the panel board for such wires or conductors cannot possibly indicate at what point a wire leaves the box in its conduit. The circuit wires cross the main feeder wires and the main feeder wires cross the circuit wires, with the result that a great fire hazard and source of trouble is developed and encouraged. The underwriters and code requirements covering electrical work provide that the wires of a circuit be properly enclosed in a conduit or raceway this is adhered to; and their code further establishes a regulation as to the number of wires that may be enclosed in a conduit and this condition is adhered to until the conduits enter the panel box and then the safety precaution established by enclosing circuit wires of each circuit in a conduit so as to entirely support and enclose the same is immediately destroyed by the crossing and rearrangement of wires, which goes on in the gutters of panel boxes, distributing boxes and switch boxes as described.

The principal object of my present invention is to provide an improved type of box or cabinet which will enclose a new arrangement of distributing switches, fuses, bus bars, connecting posts, binding posts, etc., and which is applicable to electric light, electric power, electric signal devices, telephone, bell or other distributing systems, and which provides that the wires or conductors, whether they be enclosed in a steel or other conduit, or whether they be protected with a special braiding of insulation, enter the cabinet at a point approximately opposite where their connections will be made, without causing any maze of crossing wires or conductors.

Of the accompanying drawings:

Figure 1 is a front elevation of the cabinet, with the usual front door or panel thereof omitted.

Figure 2 represents a section on line 2—2 of Figure 1.

Figure 3 represents a section on line 3—3 of Figure 1.

Similar reference characters indicate similar parts or features in all of the views.

The cabinet or box, of any suitable sheet metal, has a front wall 12 with an opening 13 for a door if one is desired. The rear of the cabinet is illustrated as recessed, although not necessarily so, to provide panels 14 for the switches, fuses, and their connections as hereinafter described, and which are arranged side by side in horizontal series instead of the usual vertical series, for a reason which will be explained.

An important feature of the cabinet is that it is so formed as to provide a projecting chamber 15 which will be hereinafter referred to as the gutter, and in which the important lead connections are arranged without any crossing of wires.

The rear recess of the cabinet may have a closing door or panel as indicated at 16.

One end of the cabinet is provided with a vertical enclosure or space 17 for the main feeder wires, separated from the rest of the interior of the cabinet by a barrier plate 18 of slate, asbestos, or other suitable material, said plate having a hole or opening 19 for certain connections which will be explained.

Supported by the panels 14 are fuses 20 and switches 21 which are not illustrated in detail as they may be of any approved type. The wires or bus strips which electrically connect them are indicated at 22, and connections similarly indicated are made with the three bus bars 23 which extend through the entire series of sets of panel-supported fuses and switches.

Conduits 24 lead to the top and bottom of the cabinet and are secured thereto by suitable nuts or bushings 25.

In the particular structure illustrated, branch circuit connections 26 through the upper conduits 24 lead to the upper series of fuses and similar connections lead through three of the lower conduits 24 to three of the lower series of fuses. The devices at the lower end of the other three panels 14 are connected to suitable circuit wires 27 leading back through the gutter 15 to the three conduits 28.

Main conduit sections 29 are coupled to the top and bottom of the cabinet and through them, and through the space 17, the main feeder wires 30 lead as illustrated in Figure 1. Said wires 30 are connected by wires 31 with the ends of the three bars 23, said connections being easily effected owing to the opening 19 in the barrier plate 18.

I have not attempted to illustrate or describe all the details of those parts and their connections which are or may be of any well known or preferred type, it being sufficient for an understanding of the present invention which consists, primarily, in the cabinet having the chamber or gutter 15 and the arrangements of the electrical devices relatively thereto so that crossing of wires is completely eliminated, as will be readily understood from the relative positions of the wires 20 and 27 in the gutter 15. This is largely due to the mounting of the panels side by side, as will be readily understood by comparing Figures 1 and 3.

Having now described my invention, I claim:—

1. A cabinet for a series of sets of electrical mechanisms or devices, said cabinet having a projecting enlargement providing a chamber or gutter traversing the series whereby a space is provided for the circuit wires in non-crossing relationship.

2. A cabinet having a series of panels each provided with electrical switch and fuse devices, said cabinet having a projecting enlarged portion providing a space traversing said series of panels, a circuit wire conduit leading to said enlarged portion and circuit wiring in said space in non-crossing relationship.

3. A cabinet having a series of panels side by side, each panel having electrical switch and fuse devices mounted therein, the lower portion of the cabinet having a projecting enlargement providing a clear space traversing the lower ends of the panels, individual conduits for the branch circuit connections for the devices of each panel, and circuit wires in each of said conduits leading directly to the devices of one panel without crossing other wires.

4. A cabinet having a series of panels side by side, each panel having electrical switch and fuse devices mounted therein, the lower portion of the cabinet having a projecting enlargement providing a clear space traversing the lower ends of the panels, individual conduits for the branch circuit connections for the devices of each panel, circuit wires in each of said conduits leading directly to the devices of one panel without crossing other wires, and bus bars for the devices of the entire series, the cabinet having a separate chamber for the main feeder wires and connections therefrom to the bus bars.

In testimony whereof I have affixed my signature.

JOHN W. HOOLEY.